United States Patent
Fujimoto et al.

(10) Patent No.: US 7,471,848 B2
(45) Date of Patent: Dec. 30, 2008

(54) PROGRAM FOR CORRECTING IMAGE DISTORTION, APPARATUS FOR CORRECTING IMAGE DISTORTION, METHOD FOR CORRECTING IMAGE DISTORTION, AND RECORDING MEDIUM STORING PROGRAM FOR CORRECTING IMAGE DISTORTION

(75) Inventors: Katsuhito Fujimoto, Kawasaki (JP); Misako Suwa, Kawasaki (JP); Hiroaki Takebe, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 11/359,096

(22) Filed: Feb. 22, 2006

(65) Prior Publication Data

US 2006/0140504 A1  Jun. 29, 2006

Related U.S. Application Data

(63) Continuation of application No. PCT/JP2004/02825, filed on Mar. 5, 2004.

(30) Foreign Application Priority Data

Oct. 24, 2003  (WO) ........................ PCT/JP03/13665

(51) Int. Cl.
    *G06K 9/40* (2006.01)
(52) U.S. Cl. ................................... 382/275
(58) Field of Classification Search ............ 348/E3.043, 348/E3.045; 382/275; 358/3.26
    See application file for complete search history.

(56) References Cited

U.S. PATENT DOCUMENTS

| 5,497,236 | A | 3/1996 | Wolff et al. |
| 5,848,197 | A | 12/1998 | Ebihara |
| 6,018,593 | A | 1/2000 | Yamagata |
| 2002/0044681 | A1* | 4/2002 | Fujimoto et al. ............ 382/154 |
| 2003/0026482 | A1* | 2/2003 | Dance ........................ 382/199 |
| 2006/0193533 | A1* | 8/2006 | Araki et al. ................. 382/275 |

FOREIGN PATENT DOCUMENTS

| EP | 1 235 181 | 8/2002 |
| JP | 4-037968 | 2/1992 |
| JP | 5-303635 | 11/1993 |
| JP | 7-095387 | 4/1995 |
| JP | 10-091783 | 4/1998 |
| JP | 10-173905 | 6/1998 |
| JP | 2002-334327 | 11/2002 |
| JP | 2003-069807 | 3/2003 |

\* cited by examiner

*Primary Examiner*—Sherali Ishrat
(74) *Attorney, Agent, or Firm*—Greer, Burns & Crain, Ltd.

(57) ABSTRACT

A projection set of geodesic lines which are parallel with each other on a curved surface of a paper face is extracted from an image in which a paper face has been imaged by an image-pickup device, using the paper face contents as a clue; and also a projection set of ruling lines which form a ruled surface corresponding to the curved surface of the paper face is extracted from the projection set of geodesic lines. Then, the curved surface of the paper face is estimated from the projection set of the geodesic lines and ruling lines, and distortion of the image is corrected based on this curved surface of the paper face. If this is done, correspondence with various types of diverse distortions becomes possible, and distortion correction can be performed even when only one part of the paper face appears in the image.

7 Claims, 14 Drawing Sheets

ORTHOGRAPHIC PROJECTION OF RULING LINES

PARALLEL GEODESIC LINES ON THE PAPER FACE $a_1 : b_1 = a_2 : b_2 = a_3 : b_3 = \ldots$

PROGRAM FOR CORRECTING IMAGE DISTORTION, APPARATUS FOR CORRECTING IMAGE DISTORTION, METHOD FOR CORRECTING IMAGE DISTORTION, AND RECORDING MEDIUM STORING PROGRAM FOR CORRECTING IMAGE DISTORTION

This application is a continuation of PCT/JP2004/002825, filed on Mar. 5, 2004.

BACKGROUND OF THE INVENTION

1. Field of the Invention

The present invention relates to technology for correcting three dimensional distortion of an image, to a high accuracy.

2. Description of the Related Art

Nowadays, in the financial world such as of banking, with a goal of improving the efficiency of input operations, a technique which uses a non contact type image-pickup device such as a CCD (charge coupled device) or a digital camera, for inputting a paper record or paper document at high speed and conveniently is being put to practical use. When the non contact type image-pickup device is used, then compared to a contact type image-pickup device such as an image scanner, the convenience of being able to write etc. on the paper face even during image input, and being able to effect high speed image input while viewing the paper, can be enjoyed.

On the other hand, in the image input by the non contact type image-pickup device, there exists a perspective transformation distortion attributable to the non contact image input, and image distortion attributable to bending of the paper face curved surface. Furthermore, even with an image which is input by the contact type image-pickup device, if this is one where the paper face of a thick book is imaged, since the paper face becomes a curved surface, then similarly there exists an image distortion. Therefore, in the input images by the use of the image-pickup device, technology for correcting these image distortions becomes indispensable. Therefore, the present applicants has proposed, as disclosed in Japanese Unexamined Patent Publication No. 2002-150280, a technique for estimating the paper face curved surface using as a clue the distortion of a two dimensional outline of the paper face extracted from the image, and correcting the distortion of the image.

However, in this proposed technique, the types of distortion which are the object of correction are limited, and also it is necessary to specify these types, so that for actual images where the types of distortion are diverse, application of the technique must become difficult. Furthermore, when the whole of the paper face does not appear in the image, the outline thereof cannot be extracted, and hence various restrictions are imposed on the image correction.

SUMMARY OF THE INVENTION

Therefore, the present invention takes into consideration the above such conventional problems, with an object of providing an image distortion correction technique which estimates the curved face of a paper face (it will be hereinunder referred to as "paper face curved face") with the contents of the paper face as a clue, thereby enabling correspondence with various types of diverse distortions, and also enabling distortion correction even when only one part of the paper face appears in the image.

Therefore, an image distortion correction technique according to the present invention includes: extracting from an image in which a paper face has been imaged, a projection set of geodesic lines which are parallel with each other on a curved surface of a paper face, using the paper face contents as a clue; and extracting from the projection set of geodesic lines, a projection set of ruling lines which form a ruled surface corresponding to the paper face curved surface. Then, estimating the paper face curved surface from the projection set of the extracted geodesic lines and ruling lines, and correcting distortion of the image based on this paper face curved surface.

According to this configuration, compared to distortion correction using the paper face outline as a clue, the paper face curved surface is estimated using the contents of the paper face as a clue. Therefore correspondence with diverse distortion types is possible, and even from an input image for where only a part of the paper face appears in the image, high accuracy distortion correction can be performed.

Here, regarding the projection set of the ruling lines, this is preferably extracted by searching for the ruling line projection, from the projection set of the extracted geodesic lines, using the geometrical property that the ratio of line segment lengths for where the ruling line projection is cut by the geodesic line projection is constant. At this time, from amongst the projection set of the extracted geodesic lines, it is preferable to extract the projection set of the ruling lines, excluding geodesic line projections which do not satisfy the geometrical property that the slope of the tangent to the ruling line projection at the intersection point of the ruling line projection and the geodesic line projection is constant. If this is done, then it becomes possible to judge the authenticity of the extracted geodesic line projection, and extraction of parallel geodesic lines which are robust with respect to noise, can be realized.

Furthermore, regarding the paper face curved surface, it is preferable to estimate the width between the upper end side geodesic line projection and the lower end side geodesic line projection, from the projection set of the extracted geodesic lines and ruling lines, and solve the quadratic equations for the number of ruling lines derived using the integration/differentiation method from the geometrical properties of the parallel geodesic lines. At this time, it is preferable to estimate the width between the top end side geodesic line projection and the bottom end side geodesic line projection from the principle of majority decision for the angle subtended by the ruling line and the image imaging direction on the paper face curved surface.

Furthermore, regarding the projection set of the ruling lines, it is preferable to use the projection set of the extracted geodesic lines, and search for and extract from amongst the aggregate of the ruling lines, for which the internal ratio due to the internal geodesic line projection positioned between the upper end and the lower end becomes constant, the part where the sum total of the deviations from the internal ratio becomes a minimum. At this time, the paper face curved surface is estimated using the height of the picked-up image with respect to the paper face curved surface, and the geometrical property where the tangent vectors to the geodesic lines at the upper end and lower end intersecting with one ruling line are parallel. If this is done, then considering the transparent distortion due to the non contact type image-pickup device such as a digital camera, more highly accurate distortion correction can be performed.

Other objects and aspects of the present invention will become apparent from the following description of the embodiments, in conjunction with the accompanying drawings.

BRIEF DESCRIPTION OF THE DRAWINGS

FIG. 9 is an explanatory view of an image for which a projection set of ruling lines has been extracted;

FIG. 10 is an explanatory view of a corrected image for which image distortion has been corrected;

DESCRIPTION OF THE PREFERRED EMBODIMENTS

Hereunder is a detailed description of the present invention, with reference to the accompanying drawings.

In the present invention, a configuration for correcting the image distortion, using as a clue, the contents of the paper face appearing in the image rather the outline of the paper face is adopted. For the paper face contents, it is necessary to satisfy both that there is a property "stability" which can be stably acquired irrespective of a diversity of printing and written matter on the paper face, and a property "locality" that can be used even if the whole of the paper face cannot be acquired. Therefore, by extracting virtual parallel lines from character strings or ruled lines (guide lines) within the paper face, and using the property that these parallel lines become parallel geodesic lines on the distorted paper face curved surface, distortion correction is performed by shape restoration from parallel geodesics.

Figure 1:
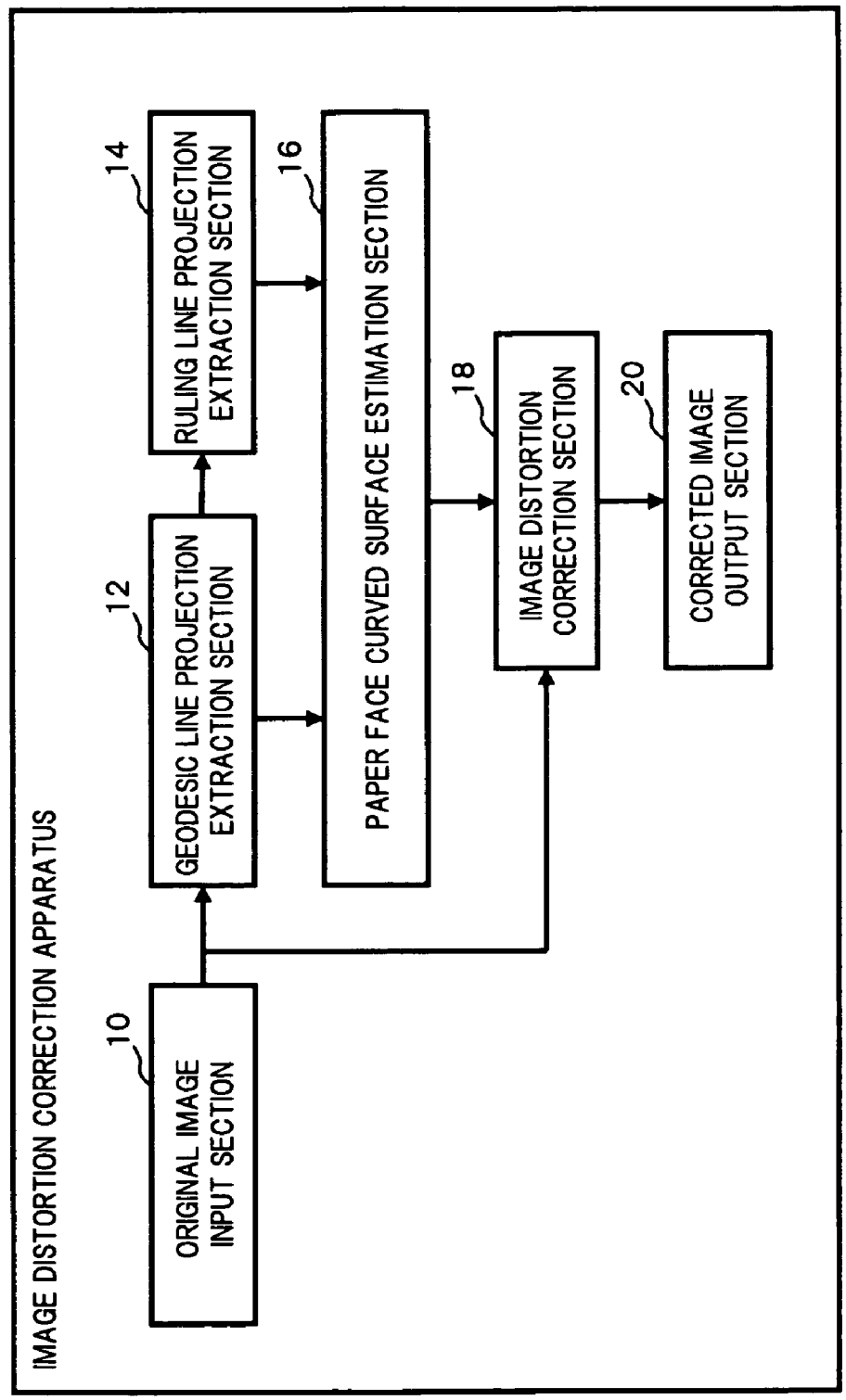
FIG. 1 is a block diagram of an image distortion correction apparatus which embodying the present invention.

In order to realize distortion correction by shape restoration from parallel geodesics, the image distortion correction apparatus realized by the present invention, is configured to include as shown in FIG. 1, an original image input section 10, a geodesic line projection extraction section 12, a ruling line projection extraction section 14, a paper face curved surface estimation section 16, an image distortion correction section 18, and a corrected image output section 20. The image distortion correction apparatus is constructed on a computer system furnished with at least a central processing unit and a memory, and by means of an image distortion correction program loaded into memory, various functions for correcting image distortion are realized.

In the original image input section 10, a function is provided for inputting an image taken by picking up the image of the paper face via a non contact type image-pickup device such as a digital camera, or a contact type image-pickup device such as an image scanner. Here, the image input is not limited to a configuration where the image is input from the image-pickup device in real time, and may be a configuration where an image which has been specified from amongst taken images which have been recorded on various types of recording media is input. By means of the function provided from the original image input section 10, an image input function and an image input device are individually realized.

In the geodesic line projection extraction section 12, a function is provided for extracting a projection set of the geodesic lines which are parallel with each other on the paper face curved surface, from the image (hereunder called the input image) input by the original image input section 10. The extraction of the geodesic line projection set is realized by extracting a plurality of character strings or ruled lines which can be regarded as geodesic lines, from the input image, and obtaining the aggregate or set of these lines which are projected on a two dimensional plane. By means of the function provided from the geodesic line projection extraction section 12, a geodesic line projection extraction function, a geodesic line projection extraction device, and a geodesic line projection extraction step are individually realized.

In the ruling line projection extraction section 14, a function is provided for searching for and extracting a projection set of the ruling lines from the projection set of geodesic lines which has been extracted by the geodesic line projection extraction section 12, using the fact that "the ratio (ratio vector) of the line segment lengths for where the ruling line projection is cut by the geodesic line projection is constant" or the fact that "the internal ratio of the ruling line projection due to the internal geodesic line projection positioned between the upper end and the lower end is constant", being the geometrical properties of the geodesic lines. Here the three dimensional curved surface on which the paper face can be bent, is generally called a "ruled surface", and it is know that with respect to an optional point on this surface, there is a straight line (ruling line) on the curved surface which passes through this point. By means of the function provided from the ruling line projection extraction section 14, a ruling line projection extraction function, a ruling line projection extraction device, and a ruling line projection extraction step are individually realized.

In the paper face curved surface estimation section 16, a function is provided for estimating the paper face curved surface in the input image, from the projection set of the geometric lines and the ruling lines which are individually extracted by the geodesic line projection extraction section 12, and the ruling line projection extraction section 14. That is to say, the width between the top end and the bottom end of the parallel geodesic lines for when the paper face curved surface has been smoothly flattened out is estimated based on the principle of majority decision for the angle subtended by the ruling line of the paper face curved surface, and the image picking-up direction thereof. Next, by solving the quadratic equation for the ruling line number portion derived using the integration/differentiation method due to the geometrical properties of the parallel geodesic lines, the paper face curved surface is estimated. Alternatively, by solving an equation derived from the height of the picked-up image with respect to the paper face, and the fact that "the tangent vectors to the geodesic lines at the upper end and lower end intersecting with one ruling line become parallel", being the geometrical property of parallel geodesic lines, the paper face curved surface is estimated. By means of the function provided from the paper face curved surface estimation section 16, a paper face curved surface estimation function, a paper face curved surface estimation device, and a paper face curved surface estimation step are individually realized.

In the image distortion correction section 18, a function is provided for correcting distortion of the image by performing pixel association with respect to the input image, based on the paper face curved surface estimated by the paper face curved surface estimation section 16. By means of the function provided from the image distortion correction section 18, a distortion correction function, a distortion correction device, and a distortion correction step are individually realized.

In the corrected image output section 20, a function is provided for outputting the input image (hereunder called corrected image) which has been corrected by the image distortion correction section 18. Here image output is not limited to a configuration which outputs to a function which executes various kinds of image processing using the corrected image, and may be a configuration which saves the corrected image on various kinds of recording media.

Figure 2:
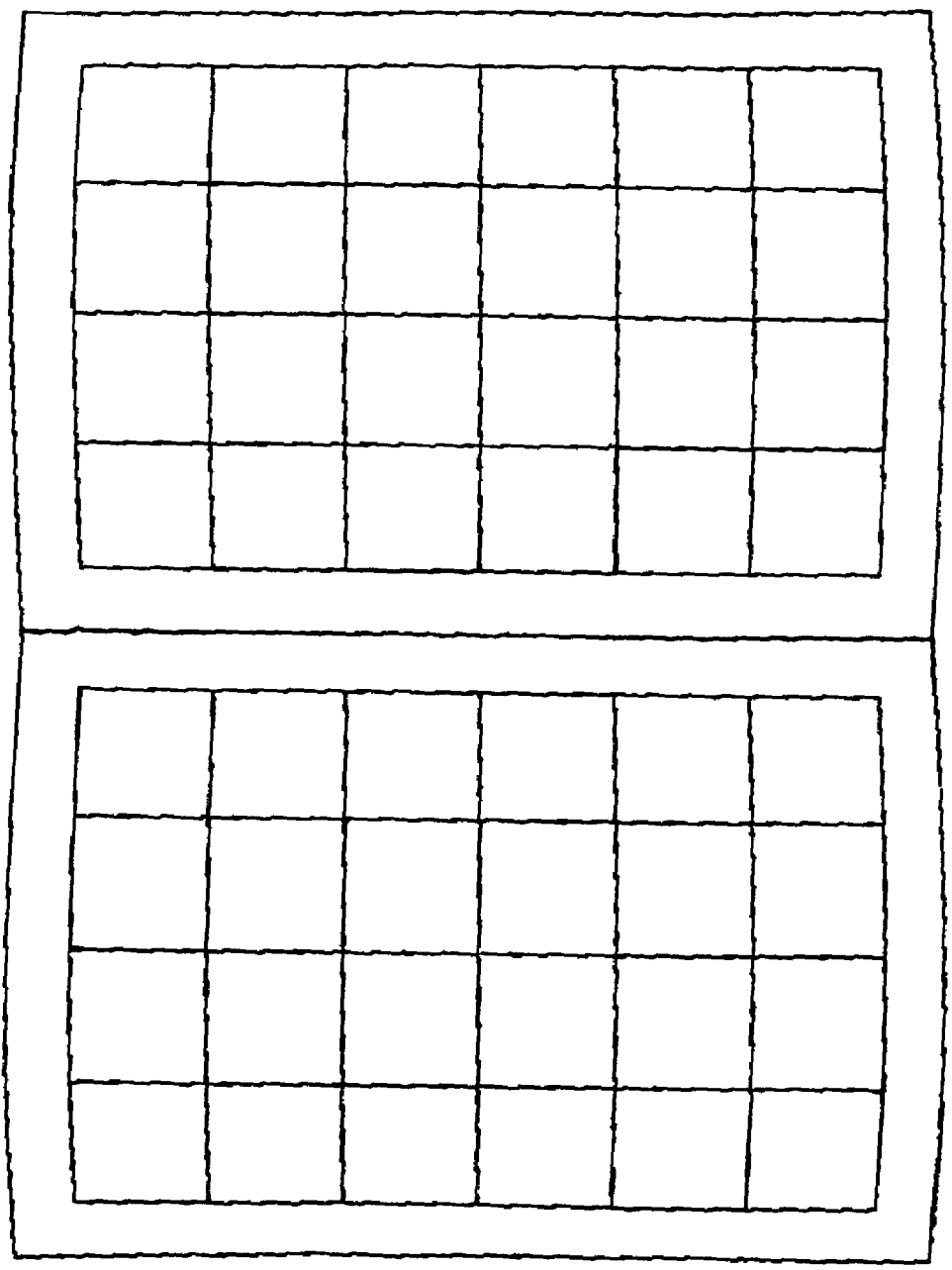
FIG. 2 is an explanatory view of a center folded sheet depression distortion which is an object of correction.
Figure 3:
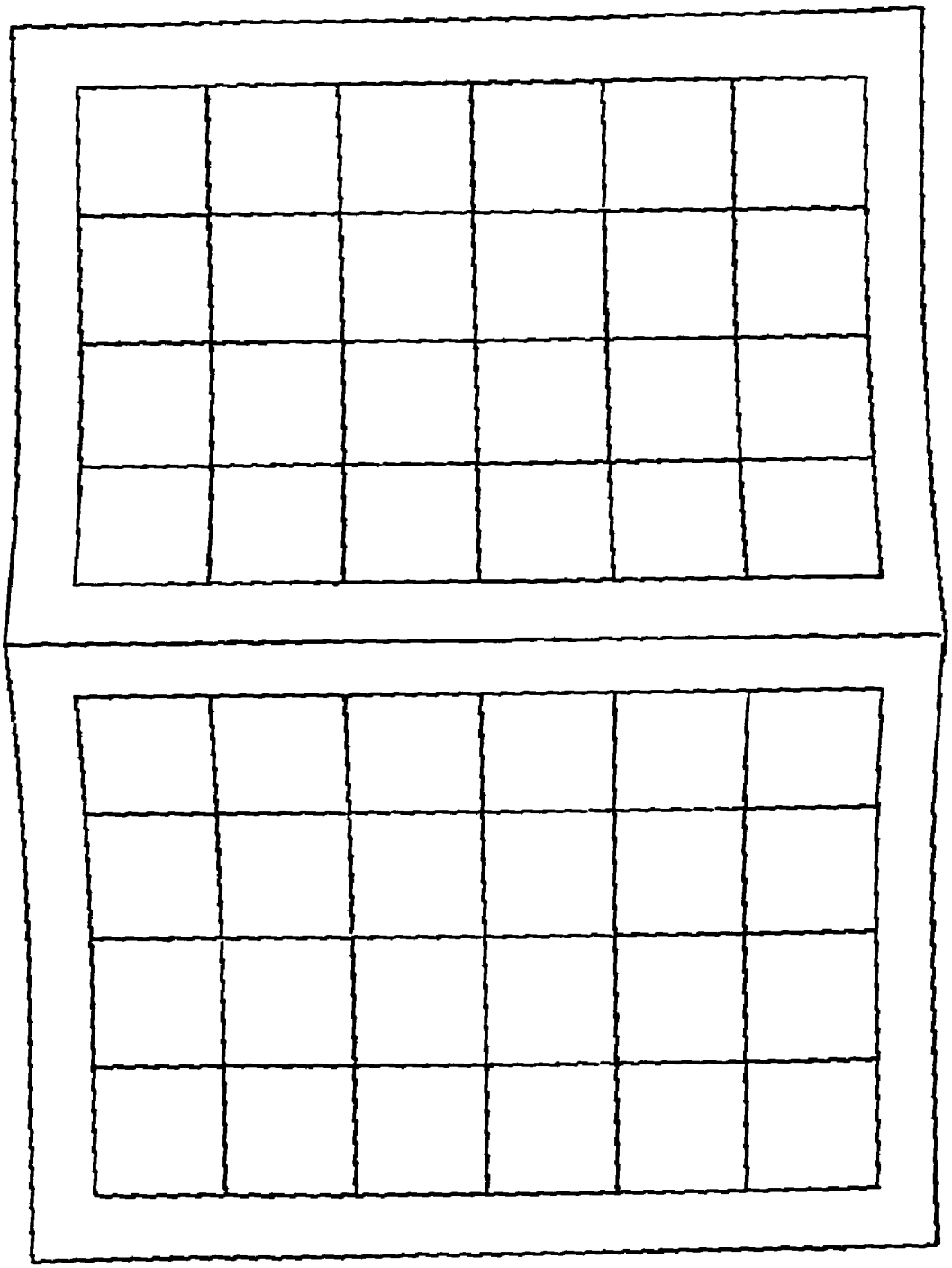
FIG. 3 is an explanatory view of a center folded sheet floating distortion which is an object of correction.
Figure 4:
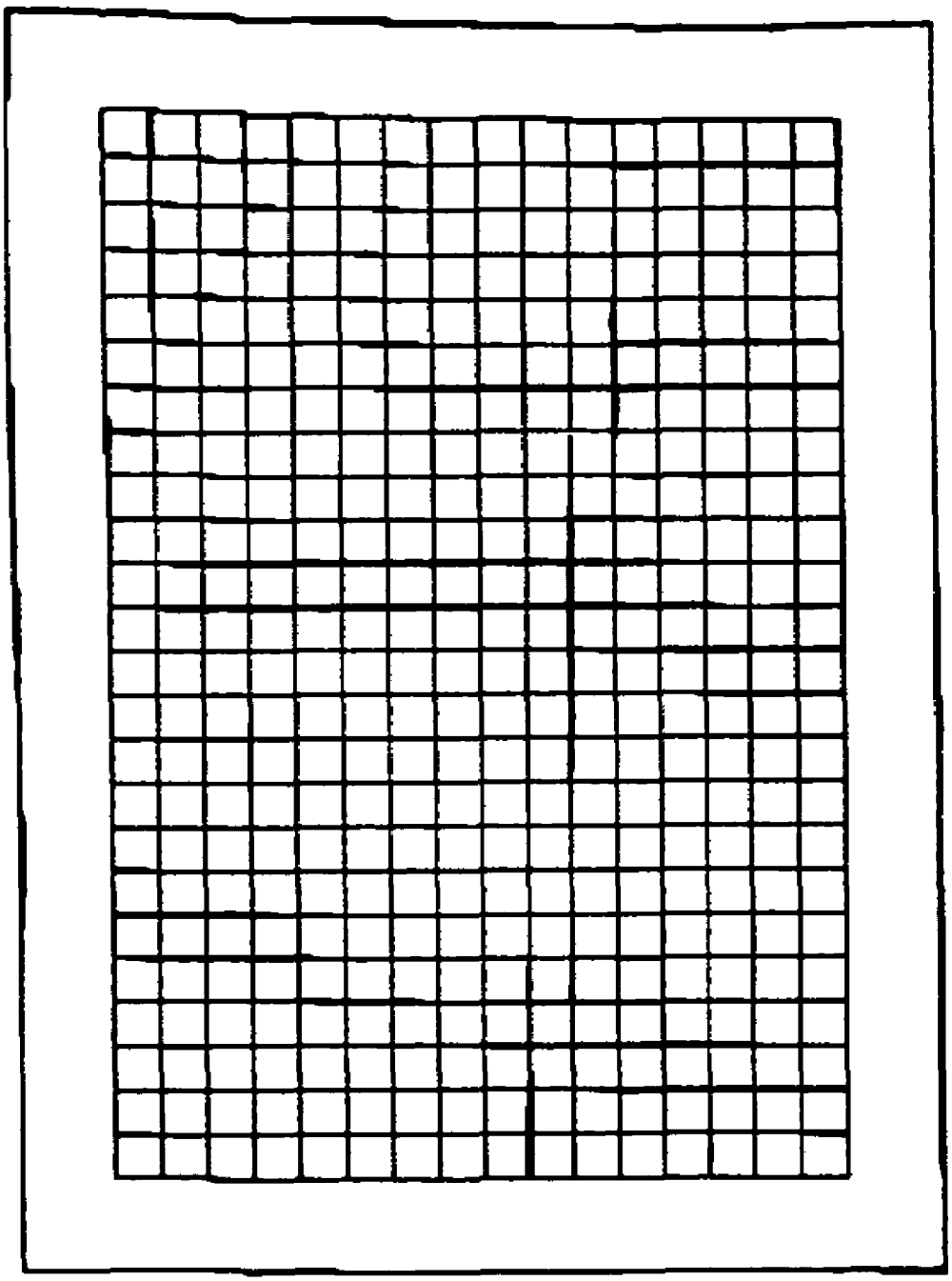
FIG. 4 is an explanatory view of a vertex floating distortion, which is an object of correction.
Figure 5:
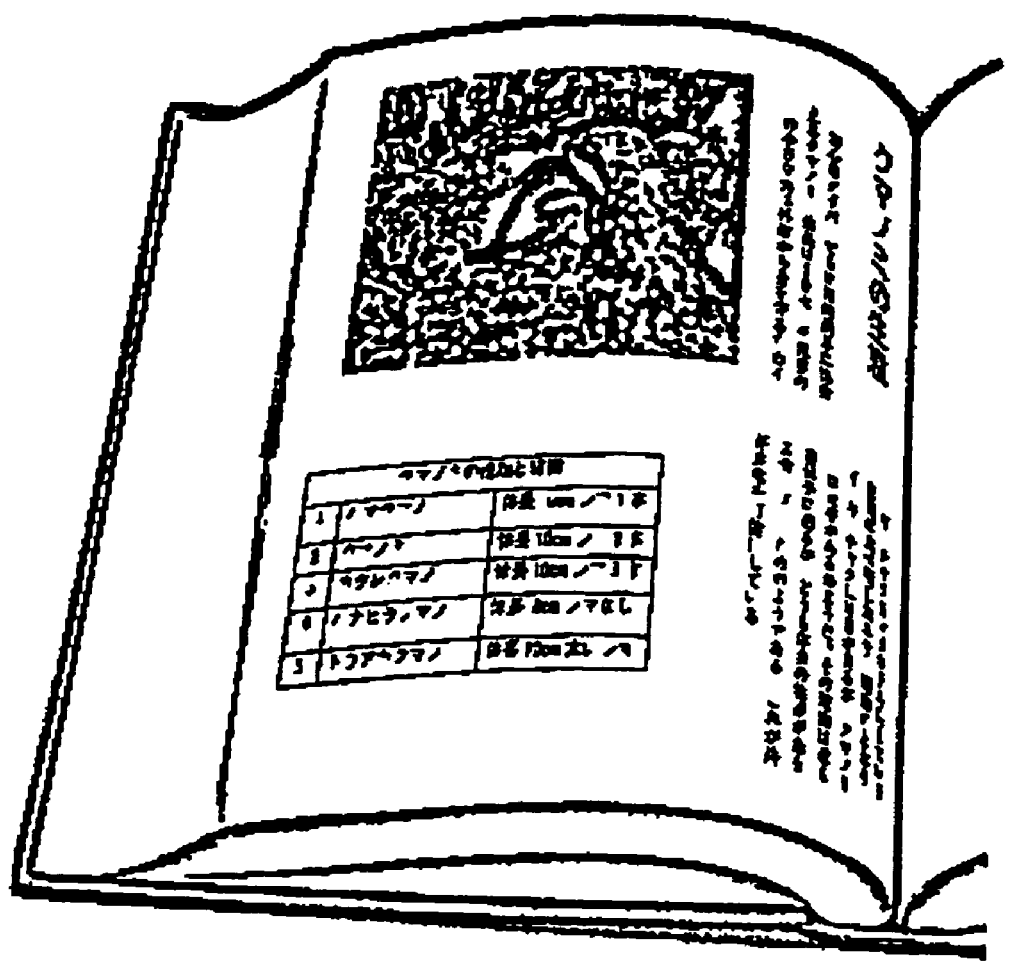
FIG. 5 is an explanatory view of a book distortion, which is an object of correction.

For the image distortion which becomes the correction object in the image distortion correction apparatus, there is; "center folded sheet depression distortion" and "center folded sheet floating distortion", which are generated on the paper face with a crease in the central portion, such as respectively shown in FIG. 2 and FIG. 3, "vertex floating distortion" where the paper face floats up in the vicinity of the vertex as shown in FIG. 4, "book distortion" as shown in FIG. 5, and so on. Here in the vertex floating distortion shown in FIG. 4, the appearance is shown for where the upper left portion of the paper face floats up. Furthermore, the book distortion is distortion attributable to where a thick book such as a dictionary, a technical book, a hand book or the like is imaged from an incline using a non contact type image-pickup device, and is a combined distortion of the distortion attributable to perspective transformation (perspective transformation distortion), and the distortion attributable to the fact that the paper face itself of the book is originally a three dimensional curved surface.

Figure 6:
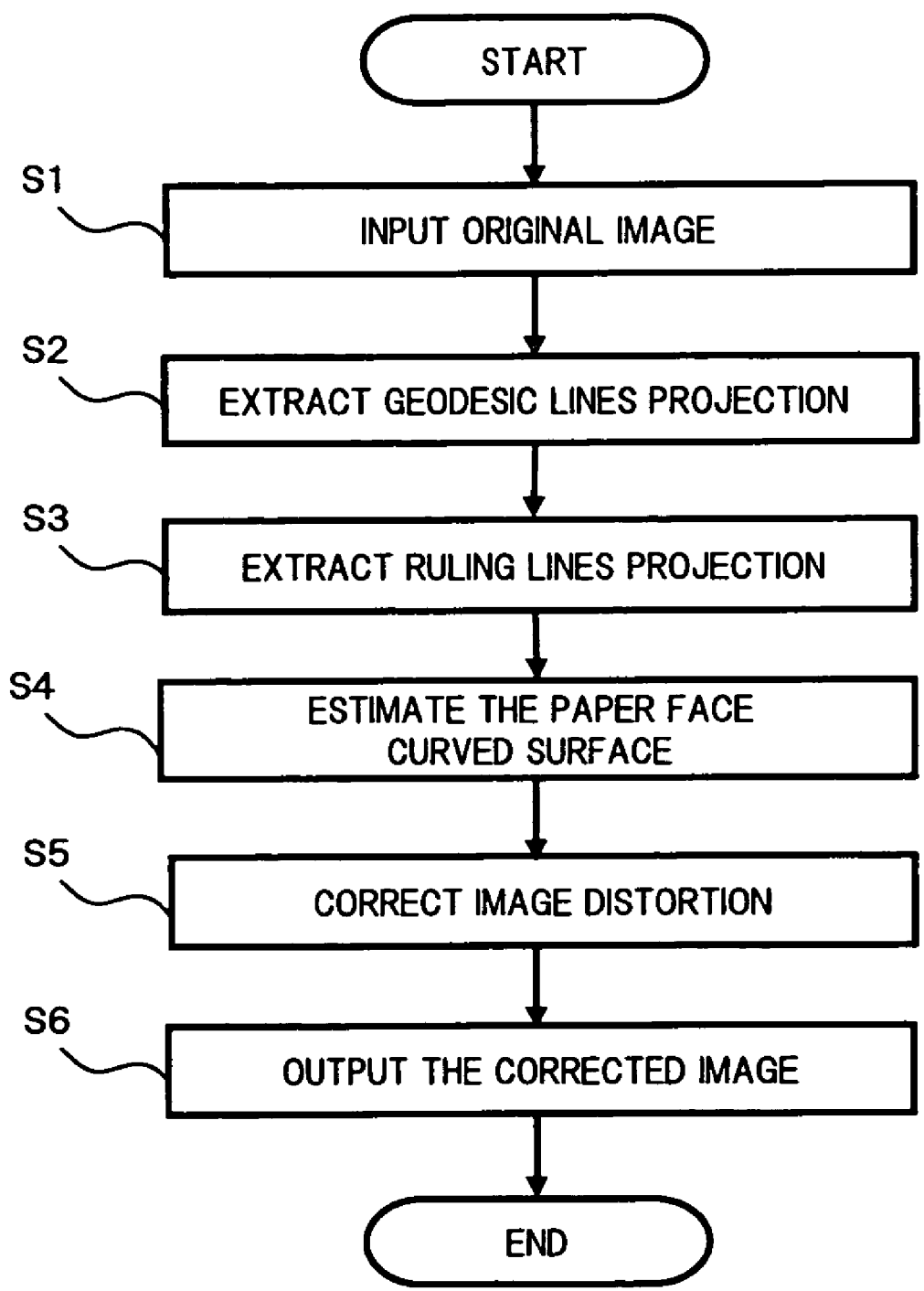
FIG. 6 is a flow chart illustrating processing contents in an image distortion correction apparatus.

Next is a description of the processing contents in the image distortion correction apparatus, with reference to the flow chart shown in FIG. 6.

Figure 7:
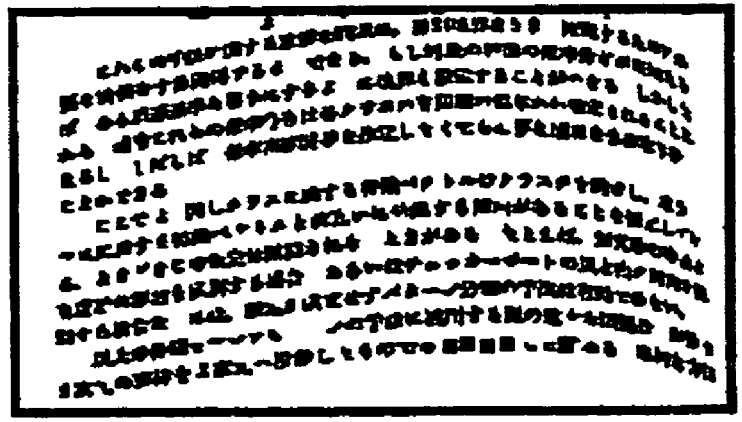
FIG. 7 is an explanatory view of an input image containing image distortion.

In step 1 (abbreviated to "S1" in the drawing, and similarly for subsequent steps); the input image which becomes the object of correction is input via the function provided by the original image input section 10. That is to say, the input image in which the image of the paper face has been smoothly distorted as shown in FIG. 7 is read in from the image-pickup device, or from various kinds of recording media.

Figure 8:
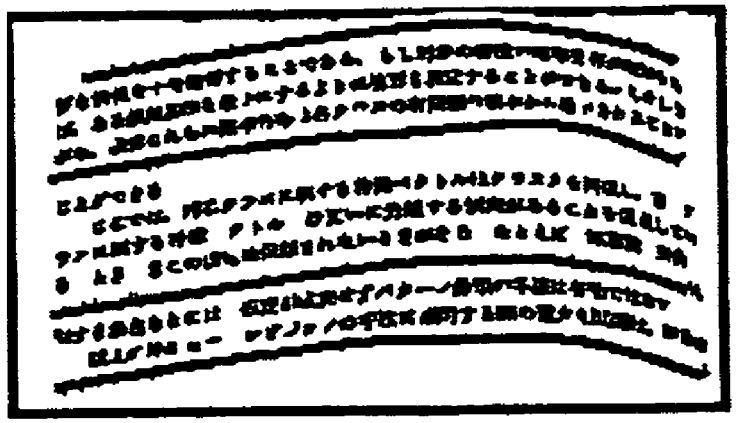
FIG. 8 is an explanatory view of an image for which a projection set of geodesic lines has been extracted.

In step 2, through the function provided by the geodesic line projection extraction section 12, the projection set of the geodesic lines which are parallel with each other on the paper face curved surface as shown in FIG. 8, is extracted from the input image which has been input by the original image input section 10.

Figures 9, 10:
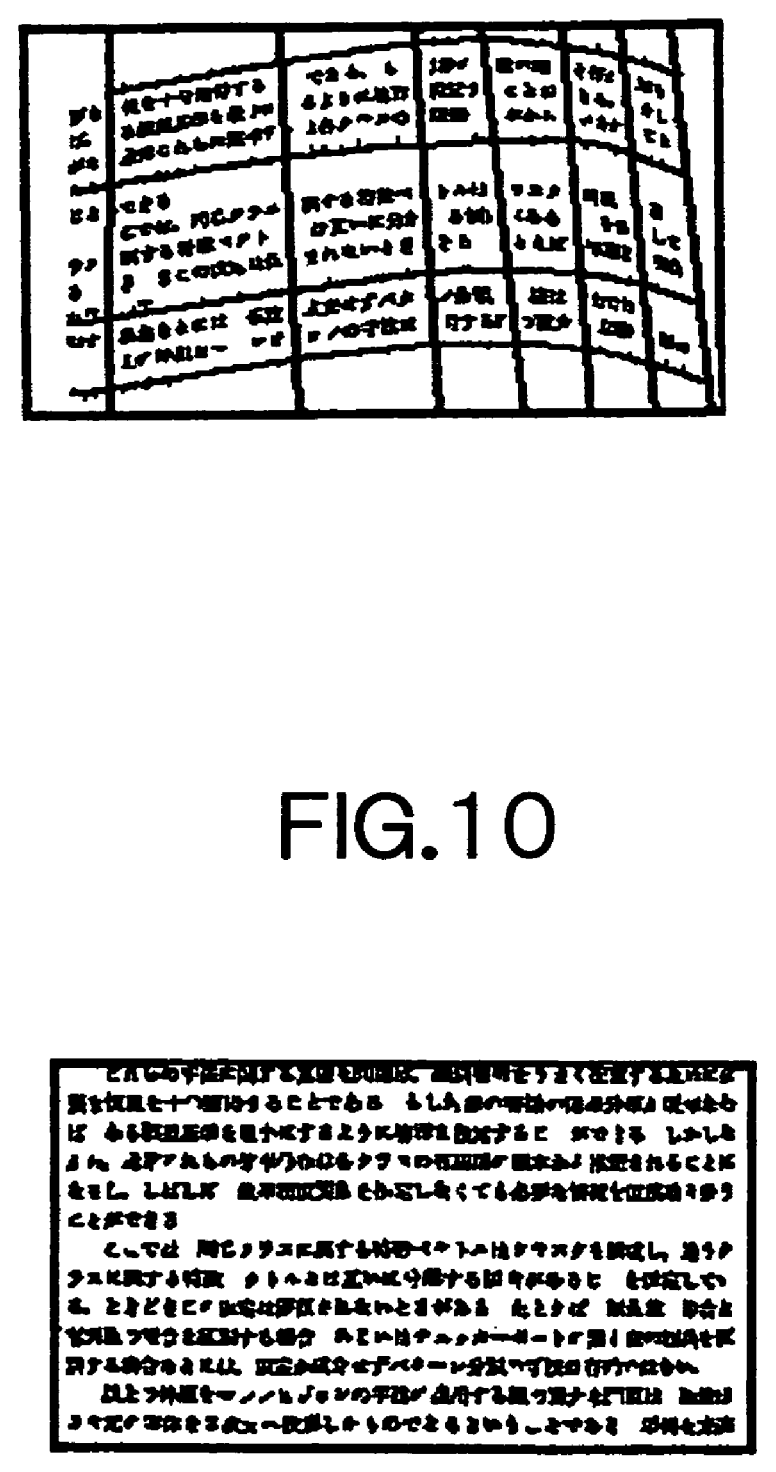

In step 3, through the function provided by the ruling line projection extraction section 14, the projection set of the ruling lines as shown in FIG. 9 is extracted from the projection set of the geodesic lines extracted by the geodesic line projection extraction section 12.

In step 4, through the function provided by the paper face curved surface estimation section 16, the paper face curved surface in the input image is estimated from the projection set of the geodesic lines and the ruling lines individually extracted by the geodesic line projection extraction section 12 and the ruling line projection extraction section 14.

In step 5, through the function provided by the image distortion correction section 18, the distortion of the input image is corrected as shown in FIG. 10, based on the paper face curved surface estimated by the paper face curved surface estimation section 16.

In step 6, through the function provided by the corrected image output section 20, the corrected image which has been corrected by the image distortion correction section 18, is output.

According to the processing of step 1 through step 6, the projection set of the geodesic lines which are parallel with each other on the paper face curved surface is extracted from the input image, and together with this the projection set of the ruling lines is extracted from the projection set of the geodesic lines. Then, the paper face curved surface is estimated from the projection set of the geodesic lines and the ruling lines, and based on this paper face curved surface, the distortion of the image is corrected. Therefore, compared to distortion correction using the paper face outline as a clue, the paper face curved surface is estimated using the contents of the paper face as a clue. Therefore correspondence with diverse distortion types is possible, and even from an input image for where only a part of the paper face appears in the image, high accuracy distortion correction can be performed.

Next is a description of the detailed theory of a first embodiment for image distortion correction.

A. Model for Paper Face Curved Surface

The paper face curved surface is a ruled surface which satisfies such a characteristic that, with respect to an optional point on the curved surface, there exists a straight line (ruling line) on the curved surface which passes through this point. For the clue for the distortion correction, a character string within the paper face, or virtual parallel lines which can be extracted from ruled lines are used. Parallel lines on a flat paper face become parallel geodesic lines on the paper face curved surface.

Figure 11:
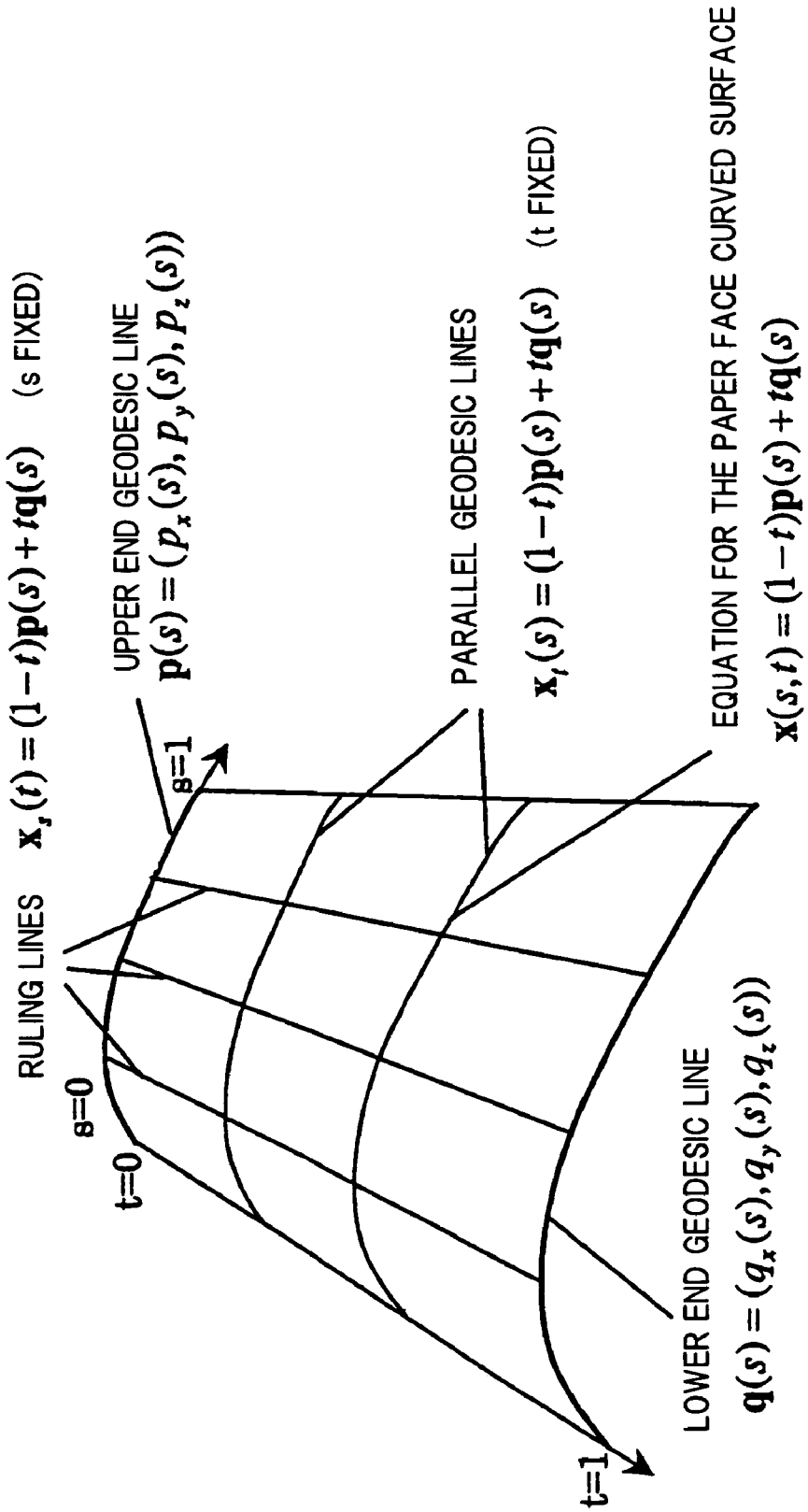
FIG. 11 is an explanatory view showing a model of a paper face curved surface.

Therefore, as shown in FIG. 11, using the curvilinear coordinate system $(s, t)$ $(0 \leq s \leq 1, 0 \leq t \leq 1)$, the paper face curved surface is expressed by $x(s, t)=(1-t)p(s)+tq(s)$. Here, $p(s)$ and $q(s)$, are respectively the geodesic lines for the top edge and the bottom edge in the paper face curved surface. The curvilinear coordinate system $(s, t)$ is set so that by fixing $s$, the ruling lines $x_s(t)=(1-t)p(s)+tq(s)$ are expressed, and by fixing $t$, the parallel geodesic lines $x_t(s)=(1-t)p(s)+tq(s)$ are expressed. Furthermore, it is assumed that the paper face curved surface $x(s, t)$ exists in the xyz coordinate space, and the image is imaged by orthogonal projection parallel with the z axis.

B. Extraction of the Parallel Geodesic Line Projection

Figure 12:
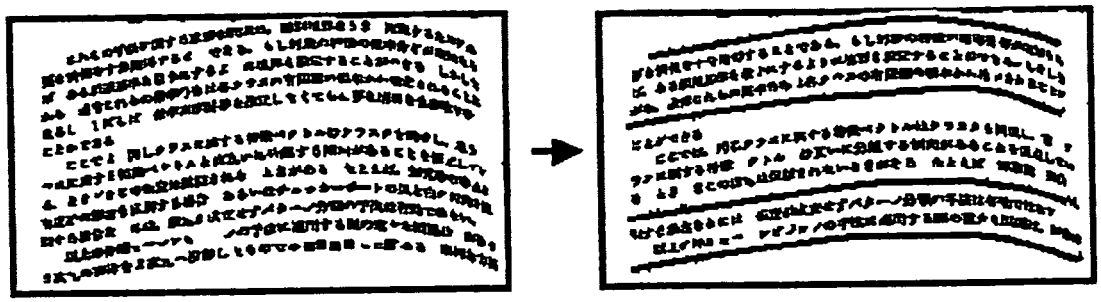
FIG. 12 is an explanatory view of a method of extracting a geodesic line projection.

As shown in FIG. 12, the projection set of the geodesic lines is extracted based on the character string or the ruled lines extracted from the input image. More specifically, the components (character components) constituting the characters in the input image, or the line segments constituting the ruled lines, are extracted, and then by combining the character components or the line segments which are adjacent to each other, the projection set of the geodesic lines can be extracted.

C. Extraction of Ruling Line Projection

The curved surface where the paper face can be bent is typically called a "ruled surface", and with respect to an optional point on this surface, there exists a straight line (ruling line) on the curved surface which passes through this point. From the projection set of the parallel geodesic lines, the projection set of the ruling lines is extracted using such a fact that "the ratio (ratio vector) of the line segment lengths for where the ruling line projection is cut by the geodesic line projection is constant", being the geometrical property of the geodesic line.

Figure 13:
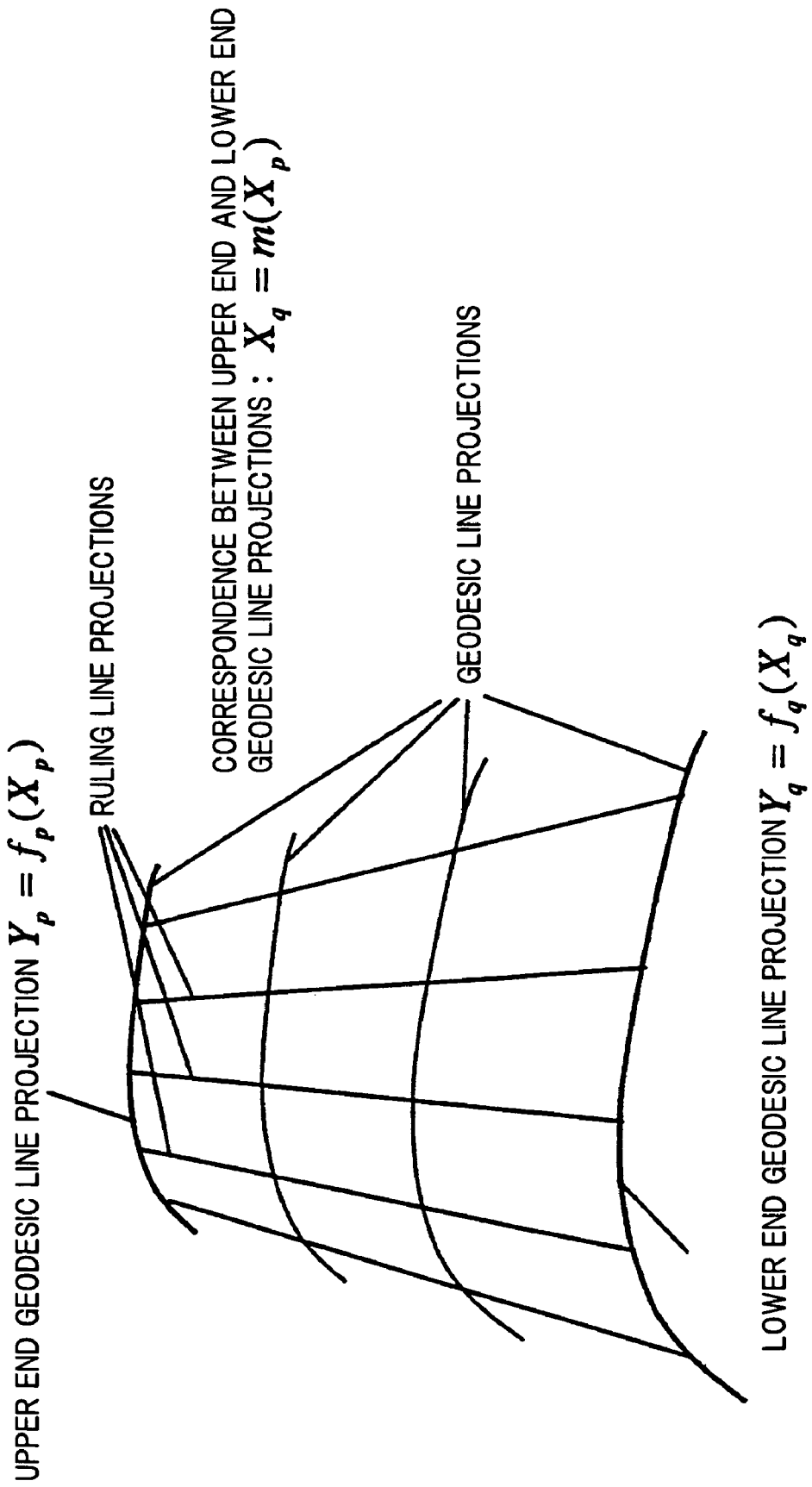
FIG. 13 is an explanatory view of a method of extracting a ruling line projection.

That is to say, as shown in FIG. 13, if the geodesic line projection for the upper end and the lower end in the paper face curved surface is made respectively $Y_p=f_p(X_p)$ and $Y_q=f_q(X_q)$, then extraction of the ruling line projection returns to obtaining the correspondence $X_q=m(X_p)$ for the geometric projection of the upper end and the lower end. Here the correspondence $X_q=m(X_p)$ is searched for from the following geometrical property which the ruling line projection possesses.

Figure 14:
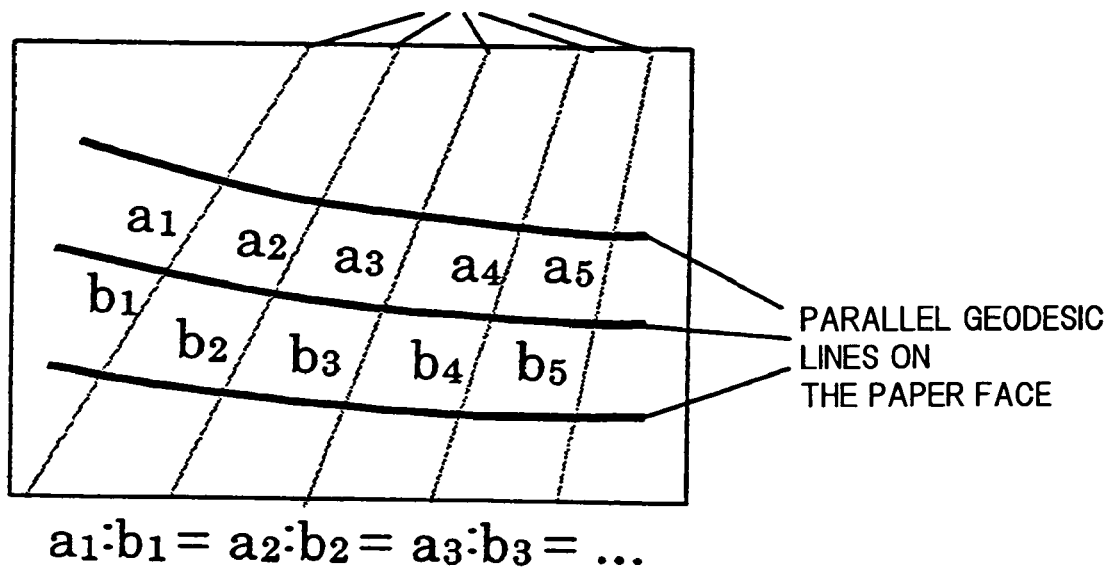
FIG. 14 is an explanatory view of the properties of a ruling line used in searching for provision of correspondence between geodesic line projections.

Characteristic 1: the ratio (ratio vector) of the line segment lengths for where the ruling line projection is cut by the geodesic line projection is constant (refer to FIG. 14)

Characteristic 2: for the respective ruling line projections, the slope of the tangent at the intersection point with the geodesic line projection is constant As a search method for the correspondence $X_q=m(X_p)$, only the characteristic 1 is used, and by means of evaluation criteria that the sum of the deviations of the ratio vectors in relation to the projection set of the geodesic lines which become the candidate, becomes a minimum, it is possible to search for the ratio vector of the ruling line projection which becomes the search object, and the projection set of the optimum ruling lines. Furthermore, by jointly using the characteristic 2, it becomes possible to judge the authenticity of the extracted geodesic line projection, and by feed back from the extraction result for the ruling line projection, extraction of parallel geodesic lines which are robust with respect to noise can be realized. That is to say, the geodesic line projections which do not satisfy characteristic 2 are excluded from amongst the projection set of the extracted geodesic lines, and the projection set of the ruling lines is extracted.

D. Estimation of Paper Face Curved Surface

When the paper face curved surface which appears on the input image, is smoothly extended to be flattened out, the width (unknown constant) between the geodesic line projections for the upper end and the lower end is estimated, to thereby estimate the paper face curved surface from the geometrical property of the geodesic lines. By adopting this method, the quadratic equation for the number of ruling lines derived using numerical differentiation and integration can be solved, and the paper face curved surface can be obtained.

At first, if the x-coordinate for the point p(s) on the upper end geodesic line projection is expressed by $x_p$, and the x coordinates for the other points is expressed by a function of $x_p$, then this gives.

$$p(s)=(p_x(s), p_y(s), p_z(s))=p(x_p)=(x_p, f_p(x_p), g_p(x_p))$$

$$q(s)=(q_x(s), q_y(s), q_z(s))=q(x_p)=(m(x_p), f_q(x_p), g_q(x_p))$$

Since by extraction of the ruling line projection, the correspondence $m(x_p)$, and the geodesic line projections $f_p(x_p)$ and $f_q(x_p)$ for the upper end and the lower end are already known, the estimation of the paper face curved surface returns to obtaining the unknown functions $g_p(x_p)$ and $g_q(x_p)$.

Figure 15:
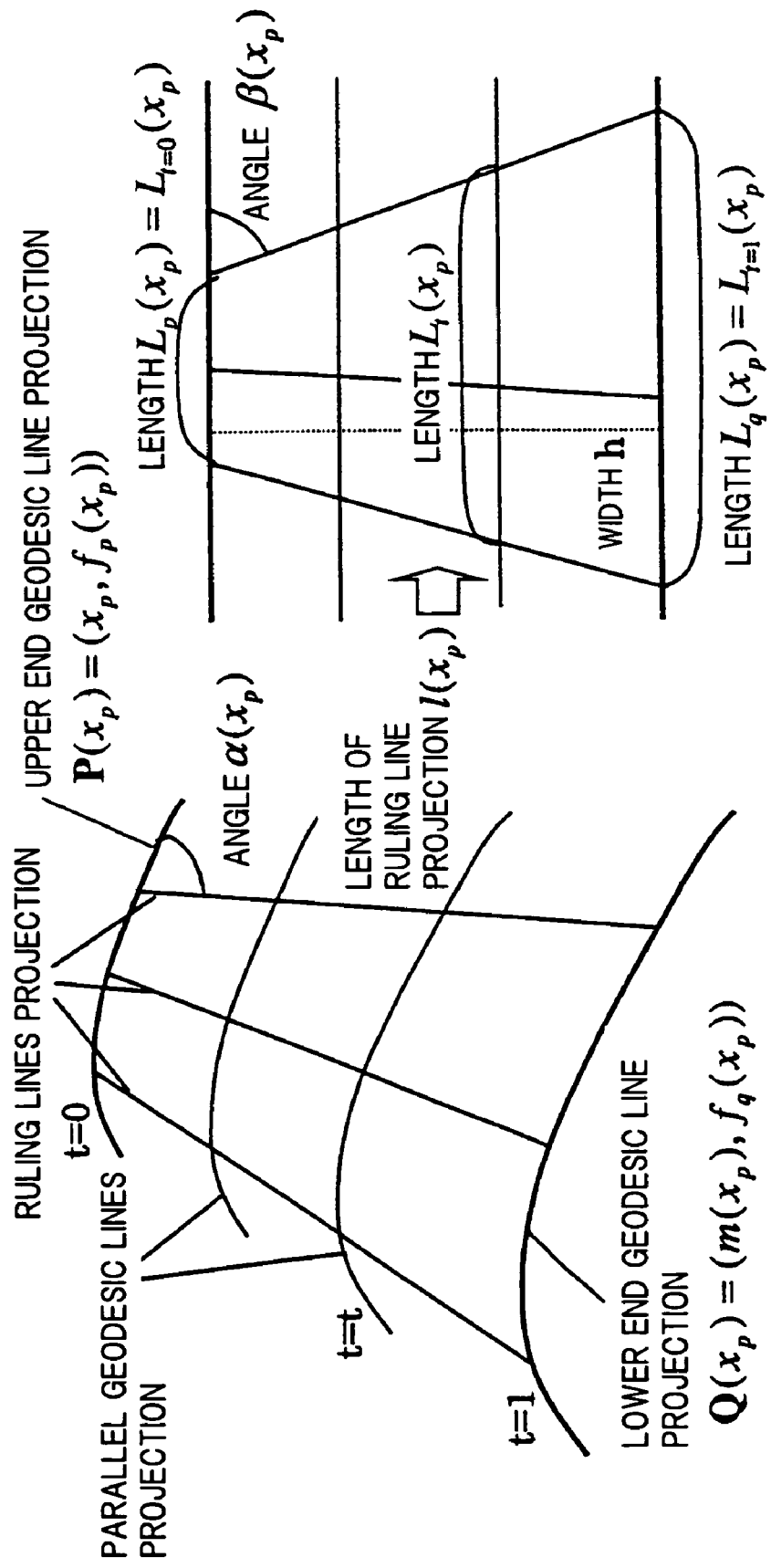
FIG. 15 is an explanatory view of a projection of the paper face curved surface, and a developed paper face for where this has been smoothly flattened out.

Incidentally, when the image-pickup device faces the paper face manuscript, and the image is imaged by orthographic projection, the correspondence between the projection of the paper face curved surface (that is, the image) and the developed paper face for when this has been smoothly flattened out, becomes as shown in FIG. 15. For the projection set of the parallel geodesic lines on the paper face curved surface projection, there is the characteristic that these are also parallel lines on the developed paper face. Therefore, in the developed paper face, the width between the parallel geodesic lines of the top edge and the bottom edge is set h. Furthermore, the angle subtended by the tangent at an optional point $P(x_p)=(x_p, f_p(x_p))$ on the upper end geodesic line projection on the paper face curved surface projection, and the ruling line projection passing through this point, is set $\alpha(x_p)$, and the length of the ruling line projection from the upper end geodesic line projection to the lower end geodesic line projection is set $l(x_p)$. Furthermore, in the developed paper face, from the left edge ruling line, the length to a point corresponding to an optional point $p(x_p)=(x_p, f_p(x_p), g_p(x_p))$ on the upper end geodesic line on the paper face curved surface is set $L_p(x_p)=L_0(x_p)$, and the angle subtended by the upper end geodesic line and the ruling line at this point is set $\beta(x_p)$. Furthermore, in the developed paper face, when the geodesic line corresponding to t=t is stretched out, the length from the intersection point with the left end ruling line to the intersection point with the ruling line which passes through the optional point $p(x_p)$ of the upper end geodesic line on the paper face curved surface is set $L_t(x_p)$.

After the ruling line projection is extracted, the angle $\alpha(x_p)$ and the length $l(x_p)$ of the ruling line projection can be calculated, and thus become already known. On the other hand, the length $L_t(x_p)$ and the angle $\beta(x_p)$ in the developed paper face are unknown. Consequently, if the length $L_t(x_p)$ and the angle $\beta(x_p)$ in the developed paper face can be obtained, an estimation of the paper face curved surface, that is to say, the unknown functions $g_p(x_p)$ and $g_q(x_p)$ showing the height of the geometric line, can be found.

If the angle (slope of the ruling line) subtended by the xy plane, and the plane in which the ruling line becomes perpendicular with respect to the intersection line with the xy plane, which is the plane including the ruling line on the paper face curved surface is set $\theta$, then the following relationship holds between the angle $\alpha(x_p)$ and the angle $\beta(x_p)$.

$$\cos\theta(x_p)\tan\alpha(x_p)=\tan\beta(x_p)$$

Moreover, among the angle $\theta$, the length $l(x_p)$ of the ruling line projection, the width h between the parallel geodesic lines, and the angle $\beta(x_p)$, the following relationship holds due to the characteristic of the slope of the ruling line.

$$\frac{h}{\sin\beta(x_p)}\cos\theta(x_p)=l(x_p)$$

$$\therefore \cos\theta(x_p)=\frac{l(x_p)}{h}\sin\beta(x_p)$$

If $\theta$ is eliminated from these, then the following equation holds.

$$\cos\beta(x_p)=\frac{h}{l(x_p)\tan\alpha(x_p)}$$

Here the width h between the parallel geodesic lines is an unknown constant. However, if assumed that this is already known by some method, then the angle $\beta(x_p)$ can be obtained from this equation.

The optional point on the paper face curved surface is expressed by $p_t(x_p)=(1-t)p(x_p)+tq(x_p)$. The intersection point of the ruling line passing through this point, and the upper end geodesic line is $p(x_p)=(x_p, f_p(x_p), g_p(x_p))$, and the intersection point with the lower end geodesic line is $q(x_p)=(m(x_p), f_q(x_p), g_q(x_p))$. Therefore the optional point $p_t(x_p)$ is a point for where these points are internally divided in the ratio t:(1−t). Consequently, from this characteristic, the optional point $p_t(x_p)$ can be expressed as follows.

$$p_t(x_p) = ((1-t)x_p + tm(x_p), (1-t)f_p(x_p) + tf_q(x_p), (1-t)g_p(x_p) + tg_q(x_p))$$

In the developed paper face, between the lengths $L_t(x_p)$ and $L_p(x_p)$ of the geodesic lines from the left end ruling line, the following equation holds from the geometrical properties of parallel lines. Here $x_p^0$ is the x coordinate (constant) of the intersection point of the left end ruling line and the upper end geodesic line.

$$L_t(x_p) = L_p(x_p) + t(h \cos \beta(x_p) - h \cos \beta(x_p^0))$$

If the geodesic lines in the paper face curved surface are stretched out, these become straight lines constituting parallel geodesic lines in the developed paper face. Therefore, for the differential of the lengths $L_t(x_p)$ and $L_p(x_p)$ in the developed paper face, the following equations hold.

$$\{L_p'(x_p)\}^2 = (p_x'(x_p))^2 + (p_y'(x_p))^2 + (p_z'(x_p))^2$$
$$= 1 + \{f_p'(x_p)\}^2 + \{g_p'(x_p)\}^2$$

$$\{L_t'(x_p)\}^2 = \{(1-t) + tm'(x_p)\}^2 + \{(1-t)f_p'(x_p) + tf_q'(x_p)\}^2 + \{(1-t)g_p'(x_p) + tg_q'(x_p)\}^2$$

On the other hand, if $L_t(x_p)$ is differentiated this gives;

$$L_t'(x_p) = L_p'(x_p) - th \beta'(x_p) \sin \beta(x_p)$$

If this is substituted in the above equation, then the following equation for an optional t holds;

$$\{L_p'(x_p) - th \beta'(x_p) \sin \beta(x_p)\}^2 = \{(1-t) + tm'(x_p)\}^2 + \{(1-t)f_p'(x_p) + tf_q'(x_p)\}^2 + \{(1-t)g_p'(x_p) + tg_q'(x_p)\}^2$$

Since this equation is a quadratic equation in t, the coefficients of the respective powers become zero.

Here putting $r(x_p) = g_q(x_p) - g_p(x_p)$, then the following equations each hold:

Second Order Terms:

$$h^2\{\beta'(x_p)\}^2 \sin^2 \beta(x_p) = \{m'(x_p) - 1\}^2 + \{f_q'(x_p) - f_p'(x_p)\}^2 + \{r'(x_p)\}^2 - L_p'(x_p)h\beta'(x_p) \sin \beta(x_p)$$

First Order Terms:

$$-L_p'(x_p)h \beta'(x_p) \sin \beta(x_p) = \{m'(x_p) - 1\} + f_p'(x_p)\{f_q'(x_p) - f_p'(x_p)\} + g_p'(x_p)r'(x_p)$$

Constant Terms:

$$\{L_p'(x_p)\}^2 = 1 + \{f_p'(x_p)\}^2 + \{g_p'(x_p)\}^2$$

Of these equations, if the width h between the parallel geodesic lines is estimated by some method, then by using the method for the numerical differentiation, $\beta'(x_p)$ and $m'(x_p)$ become already-known, and $r'(x_p)$ can be found from the equation for the second order terms. Furthermore, if this is substituted into the equation for the first order terms, then the unknown function $g_p'(x_p)$ becomes the first order equation for $L_p'(x_p)$, and by substituting this into the equation for the constant terms, the quadratic equation for $L_p'(x_p)$ can be derived. Then, by solving these for $x_p$ corresponding to each of the ruling lines, and obtaining $L_p(x_p)$ by applying numerical integration, the paper face curved surface can be estimated.

From the projection set of the geodesic lines and the ruling lines, the paper face curved surface may be estimated by the iterative method with the sum total of the deviation from the identity in the length and angle of the geodesic line in the paper face curved surface, as the energy function.

E. Estimation Method of Width h of the Parallel Geodesic Lines

Here, a method is proposed for estimating the width h between the parallel geodesic lines of the upper edge and the lower edge in the developed paper face, based on the principal of majority decision for the angle subtended by the ruling line on the paper face curved surface and the image pickup direction.

Among the slope angle $\theta(x_p)$ of a ruling line, the length $l(x_p)$ of a ruling line projection, the width h of parallel geodesic lines and the angle $\beta(x_p)$, the following relationship holds due to the characteristic of the slope of the ruling line.

$$\cos \theta(x_p) = \frac{l(x_p)}{h} \sin \beta(x_p),$$

$$\cos \beta(x_p) = \frac{h}{l(x_p) \tan \alpha(x_p)}$$

If h is fixed, then the slope angle $\theta(x_p)$ of the ruling line can be obtained, and as a result, the set $\{\theta(x_p)\}$ for the set $\{x_p\}$ can be found. Then, h for where the deviation of the set $\{\theta(x_p)\}$ becomes a minimum can be found, and this can be adopted as the optimum h.

F. Distortion Correction by Pixel Correspondence

As shown in FIG. 15, using the correspondence between the projection of the paper face curved surface and the developed paper face, then from the width h of the parallel geodesic lines obtained by estimation of the paper face curved surface, the angle $\beta(x_p)$, and the length $L_t(x_p) = L_p(x_p) + t(h \cos \beta(x_p) - h \cos \beta(x_p^0))$, pixel correspondence between the input image and the corrected image for which this is flattened out becomes possible, and hence the image distortion correction can be realized.

Next, there is provided a description of the detailed theory of a second embodiment of image distortion correction.

A. Modeling of a Paper Face Curved Surface

The paper face curved surface is a ruled surface which satisfies the characteristic that, with respect to an optional point on a curved surface, there exists a straight line (ruling line) on the curved surface which passes through this point. For the clue for the image distortion correction, virtual parallel lines which can be extracted from character strings or ruled lines within the paper face are used. Parallel lines on a flat paper face become parallel geodesic lines on the paper face curved surface.

Figure 16:
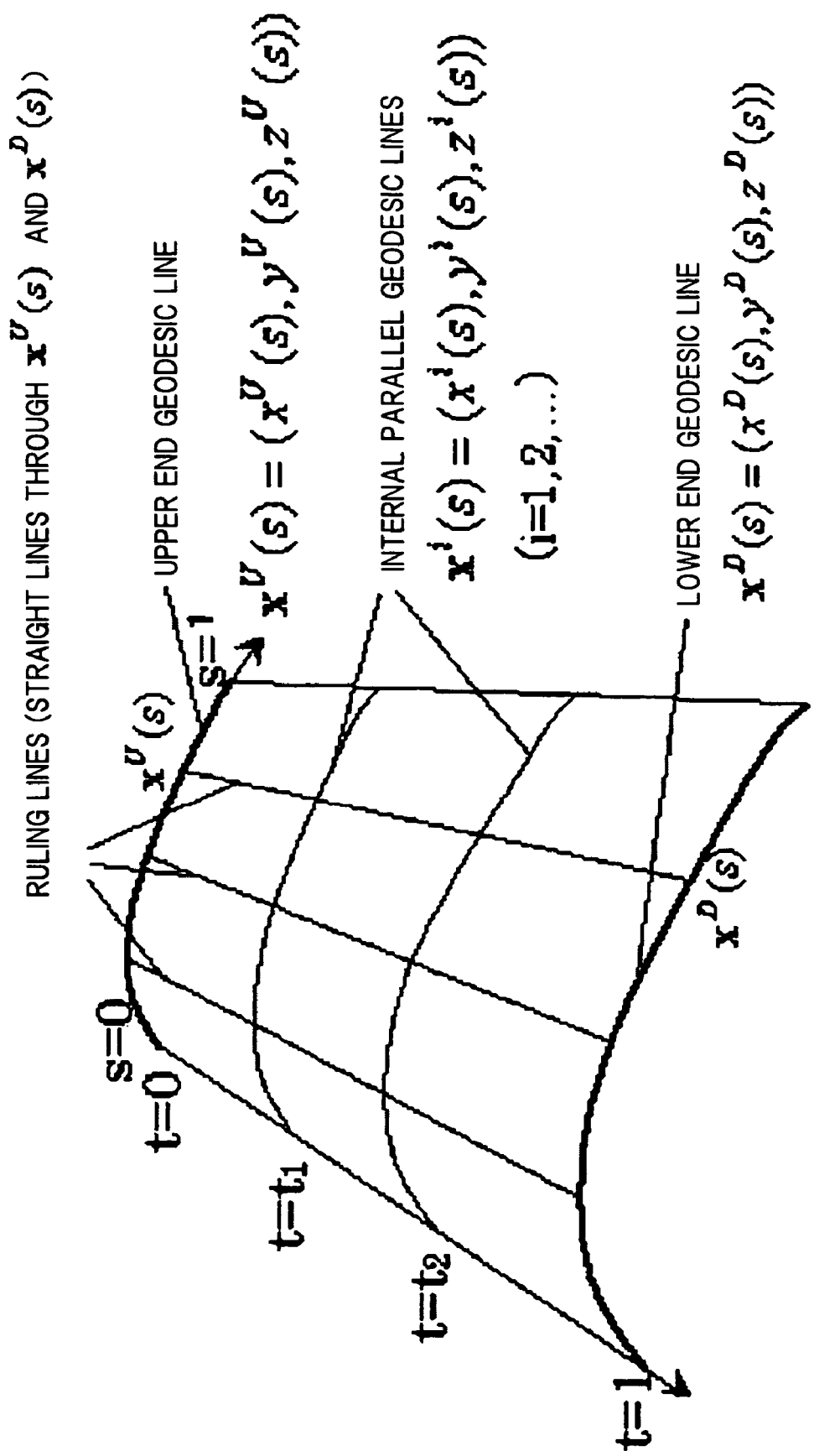
FIG. 16 is an explanatory view showing another model of a paper face curved surface.

Therefore, as shown in FIG. 16, using the curvilinear coordinate system (s, t) ($0 \leq s \leq 1$, $0 \leq t \leq 1$), the paper face curved surface is expressed by $x(s, t) = (1-t)x^U(s) + tx^D(s)$. Here, $x^U(s)$ and $x^D(s)$, are respectively the points on the geodesic lines for the top edge and the bottom edge in the paper face curved surface, and s is set so that the straight line passing through these two points becomes the ruling line. Regarding the curvilinear coordinate system (s, t), by fixing s, the ruling lines are expressed, and by fixing t, the parallel geodesic lines are expressed.

Furthermore, an input image from a non contact type image-pickup device such as a digital camera, is obtained from the paper face curved surface in the xyz coordinate space, as a perspective projection on the xy plane with the image-pickup position $x^C = (x^C, y^C, Z^C)$ as the center. Here the curved lines in the input image corresponding to the geodesic line $x^\alpha$ on the paper face curved surface, with respect to the suffix $\alpha = U, i, D$, is referred to as "the geodesic projection", and represents $X^\alpha = (X^\alpha, Y^\alpha, 0)$. Then, if the internal ratio of the height of the picked-up image for the paper face is set $h^\alpha$, then $x^\alpha = h^\alpha X^\alpha + (1-h^\alpha)x^C$ holds.

B. Extraction of Parallel Geodesic Line Projection.

As shown in FIG. 12, the projection set of the geodesic lines is extracted based on the character string or the ruled lines extracted from the input image. More specifically, the character components constituting the characters in the input image, or the line segments constituting the ruled lines, are extracted, and then by combining the character components or the line segments which are adjacent to each other, the sequence of points $X^U, X^i, X^D$ expressing the projection set of the geodesic lines can be individually extracted.

C. Extraction of Ruling Line Projection

In the input image and the paper face curved surface, if the internal ratio of the ruling line projections due to the internal geodesic line projections positioned between the upper end and the lower end is respectively $T^i(s)$ and $t^i(s)$, then $(1/t^i(s))-1 = (h^D(s)/h^U(s))((1/T^i(s))-1)$ holds. Since according to the geometrical property of parallel geodesic lines, the internal ratio $t^i(s)$ of the ruling lines due to the internal geodesic line does not rely on s, and is constant, then for the internal ratios $T^i(s)$ and $T^j(s)$ of the ruling lines due to the two internal geodesic line projections, $((1/T^i(s))-1):((1/T^j(s))-1)$ becomes constant. Hence, a search for the projection set of the ruling lines, namely, a search for the provision of correspondence between the point on the upper end geodesic line projection and the point on the lower end geodesic line projection is made, so that the sum of deviations from the above-described conditions becomes a minimum, and the parameter expression $X^U(s), X^D(s)$ is obtained.

D. Estimation of Paper Face Curved Surface

From the geometrical properties of parallel geodesic lines, the tangent vectors $\dot{x}^U(s)$ and $\dot{x}^D(s)$ of the points $x^U(s)$ and $x^D(s)$ on the geodesic lines at the upper and lower ends, which intersect one ruling line, each become parallel, and the following equation holds.

$$\begin{pmatrix} \dot{X}^U & -\dot{X}^D \\ \dot{Y}^U & -\dot{Y}^D \end{pmatrix} \begin{pmatrix} h^U/\dot{h}^U \\ h^D/\dot{h}^D \end{pmatrix} = \begin{pmatrix} X^D - X^U \\ Y^D - Y^U \end{pmatrix}$$

Consequently, if $\dot{h}^\alpha(s)/h^\alpha(s)$ ($\alpha=U, D$) is obtained, and this is considered to be $f^\alpha(s)$, the paper face curved surface is determined from the following equation.

$$h^\alpha(s) = A^\alpha \exp(\int f^\alpha(s) ds)$$

E. Distortion Correction by Provision of Image Correspondence

By provision of correspondence between the paper face curved surface and the input image, the image distortion correction can be realized.

As described above, the image distortion correction technique according to the present invention estimates the paper face curved surface with the contents of the paper face as a clue, thereby enabling application to various types of diverse distortions, and also enabling distortion correction even when only one part of the paper face appears in the image, and is thus extremely useful.

It should be understood that many modifications and variations will occur to persons skilled in the art without departing from the scope and spirit of the invention as claimed in the accompanying claims.

What we claim is:

1. A computer readable medium encoded with a program for correcting image distortion on a computer comprising:
    an image input function that inputs a picked-up image in which a paper face has been imaged, the paper face having at least character strings or ruled lines;
    a geodesic line projection extraction function that extracts from the image that has been input by said image input function, a projection set of geodesic lines which are parallel with each other on a curved surface of the paper face, using at least the character strings or ruled lines of said paper face as a clue;
    a ruling line projection extraction function that extracts from the projection set of geodesic lines that has been extracted by said geodesic line projection extraction function, a projection set of ruling lines that form a ruled surface corresponding to said curved surface of the paper face;
    a paper face curved surface estimating function that estimates said curved surface of the paper face from the projection sets of the geodesic lines and the ruling lines extracted by said geodesic line projection extraction function and said ruling line projection extraction function, respectively; and
    a distortion correction function for correcting distortion of the image input by said image input function, based on the curved surface of the paper face estimated by said paper face curved surface estimating function.

2. The computer readable medium according to claim 1, wherein said ruling line projection extraction function searches for and extracts from the projection set of the geodesic lines extracted by said geodesic line projection extraction function, a projection set of ruling lines for which the ratio of line segment lengths for where the ruling line projection is cut by the geodesic line projection is constant.

3. The computer readable medium according to claim 1, wherein said ruling line projection extraction function extracts from amongst the projection sets of the geodesic lines extracted by said geodesic line projection extraction function, projection sets of ruling lines, excluding geodesic line projections for which the slope of lines tangent to the ruling line projection at the intersection point of the ruling line projection and the geodesic line projection is not constant.

4. The computer readable medium according to claim 1, wherein said ruling line projection extraction function uses the projection set of geodesic lines extracted by said geodesic line projection extraction function, and searches from amongst the set of the ruling lines, for which the internal ratio due to the internal geodesic line projections positioned between the upper end and the lower end becomes constant, sets of ruling lines where the sum total of deviations from the internal ratio becomes a minimum, and extracts those as projection set of ruling lines.

5. The computer readable medium according to claim 1, wherein said paper face curved surface estimating function estimates the curved surface of the paper face using the image-pickup height with respect to the curved surface of paper face, and a geometrical property in which tangent vectors to the geodesic lines at the upper end and lower end intersecting with one ruling line are parallel.

6. An apparatus for correcting image distortion comprising:
    an image input means for inputting a picked-up image in which a paper face has been imaged, the paper face having at least character strings or rules lines;
    a geodesic line projection extraction means for extracting from the image that has been input by said image input means, a projection set of geodesic lines which are parallel with each other on a curved surface of the paper face, using at least the character strings or rules lines of said paper face as a clue;

a ruling line projection extraction means for extracting from the projection set of geodesic lines that has been extracted by said geodesic line projection extraction means, a projection set of ruling lines which form a ruled surface corresponding to said curved surface of the paper face;

a paper face curved surface estimating means for estimating said curved surface of the paper face from the projection set of the geodesic lines and ruling lines individually extracted by said geodesic line projection extraction means and said ruling line projection extraction means; and a distortion correction means for correcting distortion of the image input by said image input means, based on the curved surface of the paper face estimated by said paper face curved surface estimating means.

7. A method for correcting image distortion comprising executing on a computer:

a geodesic line projection extraction step for extracting from an image in which a paper face has been imaged by an image-pickup device, the paper face having at least character strings or rules lines, a projection set of geodesic lines which are parallel with each other on a curved surface of the paper face, using at least the character strings or rules lines of said paper face as a clue;

a ruling line projection extraction step for extracting from the projection set of geodesic lines that has been extracted by said geodesic line projection extraction step, a projection set of ruling lines which form a ruled surface corresponding to said curved surface of the paper face;

a paper face curved surface estimating step for estimating said curved surface of the paper face from the projection set of the geodesic lines and ruling lines individually extracted by said geodesic line projection extraction step and said ruling line projection extraction step; and a distortion correction step for correcting distortion of the image input by said image-pickup device, based on the curved surface of the paper face estimated by said paper face curved surface estimating step.

* * * * *